United States Patent [19]

Elkin

[11] Patent Number: 5,686,719

[45] Date of Patent: Nov. 11, 1997

[54] METHOD FOR FINDING VIEWING INTERVALS FOR THE CONTROL OF INSTRUMENTS, STAR TRACKERS, AND SENSORS ON EARTH AND SOLAR SYSTEM OBJECT ORBITING PLATFORMS

[76] Inventor: David Elkin, 6006 Berkeley Ave., Baltimore, Md. 21209

[21] Appl. No.: 312,747

[22] Filed: Sep. 27, 1994

[51] Int. Cl.$^6$ .................................................. G01J 1/20
[52] U.S. Cl. ........................ 250/203.1; 250/203.6; 244/3.16
[58] Field of Search ........................... 250/203.1, 203.3, 250/203.4, 203.6, 306, 307; 244/3.16–3.18; 359/399, 429; 235/462, 472; 356/141.1, 141.2, 141.3, 142, 147

[56] References Cited

U.S. PATENT DOCUMENTS 5,012,081  4/1991  Jungwirth et al. .................. 250/203.6
5,206,499  4/1993  Mantravadi et al. ................ 250/203.6

Primary Examiner—Edward P. Westin
Assistant Examiner—Que T. Le
Attorney, Agent, or Firm—Cushman Darby & Cushman, LLP

[57] ABSTRACT

A telescope or other viewing instrument is controlled to optimally observe objects based on continuous or periodic determinations of whether geometrical or physical constraints are satisfied over specific intervals of time, including a cumulative determination of background light. A program stores results in data structures for algorithm matching and for simplified adjustment of constraint parameters. Preliminary visibility intervals are determined using geometrical or physical constraints to restrict the computation. Other constraints such as limiting cumulative background light flux are used to determine the resulting visibility intervals based on the preliminary visibility intervals. A device for scheduling observations based on the visibility intervals is described. A method for determining calibration of the off-axis attenuation of background light is defined.

26 Claims, 3 Drawing Sheets

T ——— Projection of LOS to target
S ——— Projection of sun vector
D1-D2 ——— Region of dark earth occultation
B1-B2 ——— Region of bright earth occultation
BEV1-BEV2-Region where bright earth is visible
θp ——— Point closest to B2 for which tangent point is bright T ————— Projection of LOS to target
S ————— Projection of sun vector
D1-D2 ————— Region of dark earth occultation
B1-B2 ————— Region of bright earth occultation
BEV1-BEV2 — Region where bright earth is visible
Θp ————— Point closest to B2 for which tangent point is bright

METHOD FOR FINDING VIEWING INTERVALS FOR THE CONTROL OF INSTRUMENTS, STAR TRACKERS, AND SENSORS ON EARTH AND SOLAR SYSTEM OBJECT ORBITING PLATFORMS

BACKGROUND OF THE INVENTION

1. Field of the Invention

The present invention relates to a method and apparatus for determining visibility intervals for viewing objects, such as celestial targets, by single and multiple instrument platforms, and more specifically to a device for determining visibility intervals based on a determination of background light. The present invention also relates to a device for scheduling observations of multiple targets based on the determined visibility intervals.

2. Description of the Related Art

Visibility intervals in which target objects are observed may be determined to achieve control of telescopic or other viewing instruments on earth and solar system object orbiting platforms. Geometrical constraints are presently used to determine such visibility intervals. Viewing control accuracy and response are therefore limited by the constraints being used as well as the accuracy and speed with which the constraints are determined.

Conventionally, visibility determinations have been triggered by specific events and criteria. Until an event has occurred, no determination of visibility is made.

Furthermore, conventional determinations of visibility intervals have been based on line-of-sight criteria, where an unobstructed line-of-sight exists between the instrument and target. These exists between the instrument and target. These determinations do not account for the amount of background light flux received. Instead, they assume that visibility was satisfactory during the interval indicated through these line-of-sight determinations. Conventional systems therefore fail to optimize the performance of instruments used for observations. Instead, detection of valid visibility intervals is dependent upon triggering data. Furthermore, because background light is never a consideration conventionally used to determine optimum visibility intervals, observations taken during conventional intervals are susceptible to either an excess or a deficiency of background light.

One conventional device described in the SOGS Requirements Document (Space Telescope Science Institute, October 1989) is a table driven method. SOGS computes a visibility interval based on entry and exit times from a full bright earth, a full dark earth, and/or a partially bright earth.

POCC Applications Software Support (Requirements Specification, Computer Sciences Corp., 1982) provides a conservative approximation of the type of computation performed in SOGS. It is based upon geometrical relationships which avoid the exact computation for a partially bright earth.

Conventional systems as described above are unwieldy and fail to perform visibility determinations based on background light intensity. Instead, they rely on the occurrence of specific events to trigger determinations while failing to consider background light.

The present invention relates to an improved system for determining visibility intervals via the occurrence of particular events to trigger the visibility determination, and which incorporates a determination of background light intensity.

SUMMARY OF THE INVENTION

It is an object of the present invention to determine visibility intervals against geometrical constraints such as illuminated and unilluminated earth clearance limits which may require spacecraft, sun, and moon ephemerides, or their representation via analytical fits.

It is an object of the present invention to determine intervals based on physical constraints which include background light.

It is also an object to minimize or eliminate reliance upon triggering events to make determinations of target visibility and to use a less conservative background light determination.

It is an object of the present invention to utilize visibility intervals which correspond to a plurality of targets for scheduling observation of those targets.

It is an object of the present invention to store determined visibility intervals and/or data regarding observation into data structures or to output them to files.

It is an object of the present invention to permit modification of constraints used to determine visibility intervals.

It is an object of the present invention to optimize determinations of visibility intervals when constraint satisfaction is predictable.

It is an object of the present invention to iteratively refine visibility intervals based on interpolations of data relating to the spacecraft and solar ephemerides.

In order to achieve the above objects, according to the present invention, a system is disclosed for determining an interval of time for observing a target with a viewing instrument, the method including the steps of: determining first intervals of time for target observations based on predetermined constraints; measuring background light flux incident during the first intervals; calculating an accumulation of the measured incident flux, the accumulation beginning at selected first times in the first intervals and extending to the end of the first interval; comparing the accumulation to a predetermined threshold taking the signal from the target into account; determining a second time interval or set of intervals corresponding to each of the first times based on when the accumulation equals the predetermined threshold; and determining a second interval or set of intervals for observation of the target within the first intervals, the second interval being between the first time and the corresponding second time.

There is also provided a system for determining intervals of time for observing a plurality of targets with one or more viewing instruments, the method including the steps of: determining an interval of time for observing a first target, the determination including the steps of: determining at least one first preliminary interval of time for observation of the first target, the first preliminary interval being based on satisfaction of first constraints, and determining at least one second interval of time for observation of the first target, the second interval being based on an accumulated amount of background light flux incident on the viewing instrument during the first preliminary interval; determining an interval of time for observing a second target, the determination including the steps of: determining at least one second preliminary interval of time for observation of the second target, the second preliminary interval being based on satisfaction of second constraints, and determining at least one second interval of time for observation of the second target, the second interval being based on an accumulated amount of background light flux incident on the viewing instrument during the second preliminary interval; and scheduling observations of the plurality of targets based on the second intervals for observing the first and the second target.

At least one first interval for viewing can be determined using software to perform standard trigonometric calculations on geometric constraints such as clearance angle between the line-on-sight and the earth limb. Such geometric constraints are obtained from predicted orbit information derived using standard tracking procedures or computed tables.

Conventional sensor devices can be used to determine an amount of background light flux incident at any instant of time. Based on an output from the sensory device used to determine the background light flux, a well-known computational device such as a computer may be used to calculate an accumulation of the amount of background light flux determined by the sensor device from a start time. Well-known computational devices may also be used to compare the accumulated background light flux to a threshold, and to determine a benchmark (i.e., accumulation end time) based on when the accumulation reaches that threshold. A second interval for viewing may be determined by identifying an interval between the start and end time(s) using the same computational device. The method could use a calculation extracted from a model based on a calibration of theoretical values used to approximate the background light. Therefore, the term "determined" can be interpreted in the most general sense to include both measurements as described above and hereinafter, and theoretical calibration via modeling as described with respect to the following description of the preferred embodiment.

The following is disclosed in addition to the above methods: durations of the second interval are based on an amount of time required for the accumulation to equal one of a number of possible predetermined thresholds; the constraints used to determine the first intervals are characterized as one of physical, geometric or a combination of physical and geometric; the background light flux is measured while the first intervals are being determined; the background light flux is measured after the first intervals are determined; a plurality of second intervals are determined in the first intervals, each of the second intervals corresponding to a particular first time and a corresponding second time within the first intervals; and the first intervals are determined by checking for constraint satisfaction periodically.

The disclosed method may also further include a step of determining a viewing interval from among the second intervals. The viewing interval may be determined based on characteristics of the accumulated incident flux. Selection criteria, such as maximum time on target, shall be implemented.

Visibility is determined on continuous or interval dependent determinations of whether geometrical or physical constraints are satisfied over specific intervals of time. This approach enables subsystems that employ algorithm matching to store results in data structures and to easily adjust constraint parameters. Since all constraints are checked each time step, system maintenance is simplified.

The determination and optimization of visibility intervals may be constrained by background light interference or they may be generalized to the determination of visibility intervals constrained by any set of physical factors that change during the course of an observation. A set of preliminary visibility intervals may therefore be determined using geometrical or physical constraints to restrict the computation. The resulting visibility intervals are used to optimize the observation period.

This invention is applicable to orbiting astronomical observatories which consider the cumulative background light flux as a quantity of interest. The background light flux determination is therefore not limited to earth, sun or moon observation.

Other objects, features and advantages of the invention will be apparent from the following detailed description taken in connection with the accompanying drawings.

BRIEF DESCRIPTION OF THE DRAWINGS

The features of this invention which are believed to be novel are set forth with particularity in the appended claims. The invention, together with its objects and the advantages thereof, may be best understood by reference to the following description taken in conjunction with the accompanying drawings, in which like reference numerals identify like elements in the figures and in which:

DESCRIPTION OF THE PREFERRED EMBODIMENTS

Figure 1:
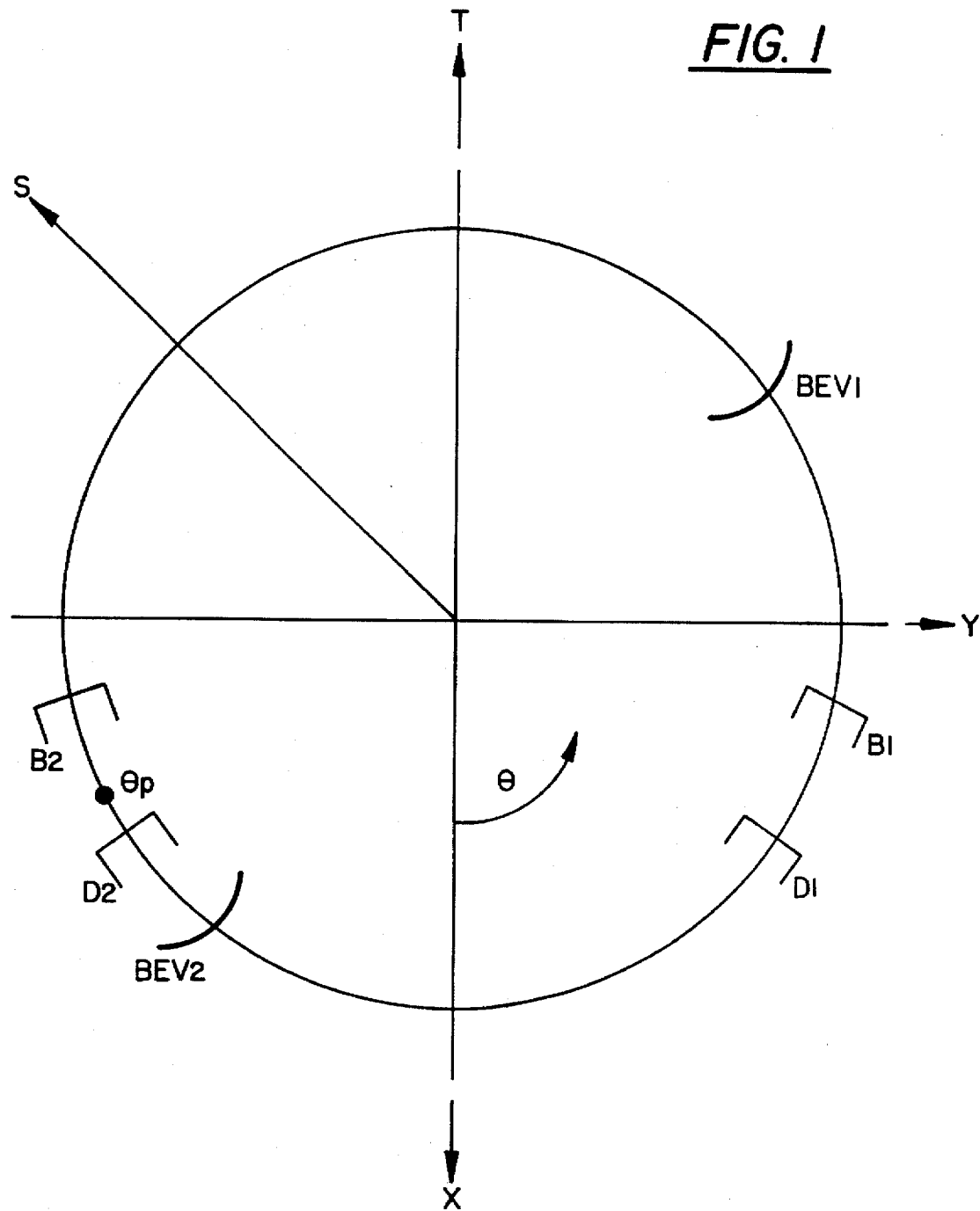
FIG. 1 is an illustration of the orbit plane.

Visibility intervals for targets observed by instruments, star trackers and sensors on earth and solar system object orbiting platforms may be determined iteratively, or they may be determined by triggering criteria. Either a stepping procedure or a set operation procedure can be used to determine target visibility, and both are refined via iteration.

The iterative approach provides a consistent technique for the determination of visibility intervals. Using this approach, determinations of visibility may be repeatedly performed as quickly as the apparatus is capable of performing them so as to maximize the performance of that apparatus.

System usage may be optimized by halting determination of visibility when constraint satisfaction or violation can be determined in advance by analytic or other procedures. Implementation of such optimization does not interfere with the determination of target visibility, instead it merely eliminates unnecessary processing from within some of the intervals from being performed.

Determinations of visibility intervals, for example, may be based on constraints of minimum allowed clearance of the field-of-view with the bright or dark earth horizon. For the purpose of illustration, the following is provided as an example of earth horizon clearance, bearing in mind that the same methods are applicable to any set of constraints that can be defined at each instant of time. Some relevant quantities are the axis-earth limb angle, a tangent point (point on the earth limb where the tangent from the spacecraft in the earth-center/spacecraft/target plane intersects the earth), and a bright/dark earth terminator. Bright and dark earth are separated by an effective terminator at an angle of $(90+\xi)$ degrees from the earth-center-to-sun vector, an atmosphere independent value (0.264 degrees) being the default. Let $\lambda_{bre}$ and $\lambda_{dke}$ be the bright and dark earth clearance angle limits respectively.

These parameters may be used as follows to determine visibility during each interval. When the tangent point is bright, target visibility is determined based on $\lambda_{bre}$. When the tangent point is dark, target visibility is determined based on $\lambda_{dke}$, except as follows, when the tangent point is dark while the bright earth limb is visible, target visibility is determined via a scan using either a bracketed minimization procedure to determine the minimum axis-to-terminator angle for comparison with $\lambda_{bre}$, or solving a quartic equation for the cosine of the minimum axis-to-terminator angle.

These angle constraints are adjustable during the course of an observation. Such adjustments may be desirable when background tolerance by the guidance sensors or other sensors or instruments increases after initial target acquisition activities, or they may be necessary when the full implementation is not possible in one of the subsystems. Visibility begins at the first time step for which these constraints are satisfied and ends at the first subsequent time step for which they are not satisfied. Refinement of the inception and termination times are obtained via iteration.

FIG. 1 is an illustration of an orbit plane of an object orbiting instrument used for target observations. S is a vector toward the sun and T is a vector toward the target being viewed. Assuming the object being orbited is positioned at or near the origin (for the purposes of this illustration only), endpoints corresponding to visibility conditions and constraints are shown along the orbit path. The regions of dark earth occultation (D–D2) and bright earth occultation (B1–B) occur when the earth is positioned between the viewing instrument and the target. Also shown are $BEV_1$ and $BEV_2$ which correspond with the region where bright earth is visible.

Figure 2:
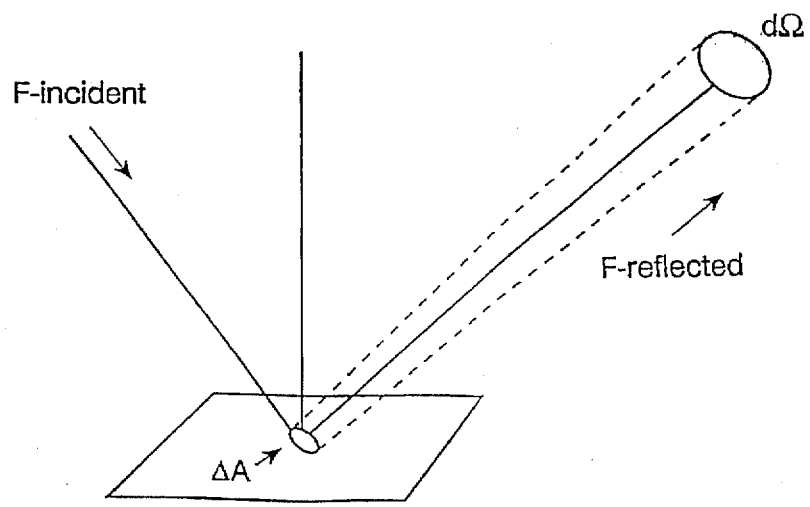
FIG. 2 is an illustration of light reflection from an elemental portion ($\Delta A$) of a surface showing directions of incident and reflected flux.

FIG. 2 is an illustration of light reflecting from an elemental portion of the earth surface. The direction of a beam of light (e.g., sun light) incident to an element of surface of area AA (normal to the vertical line) is shown. The beam is subject to diffuse reflection by the surface. A plane surface is shown, whereas a section of a sphere is relevant to diffuse reflection from the earth. E-incident is the incident flux (typical units are watts/square-meter). The reflection into solid angle element $d\Omega$ along the direction shown is represented by the reflected power $d\phi$-reflected.

Figure 3:
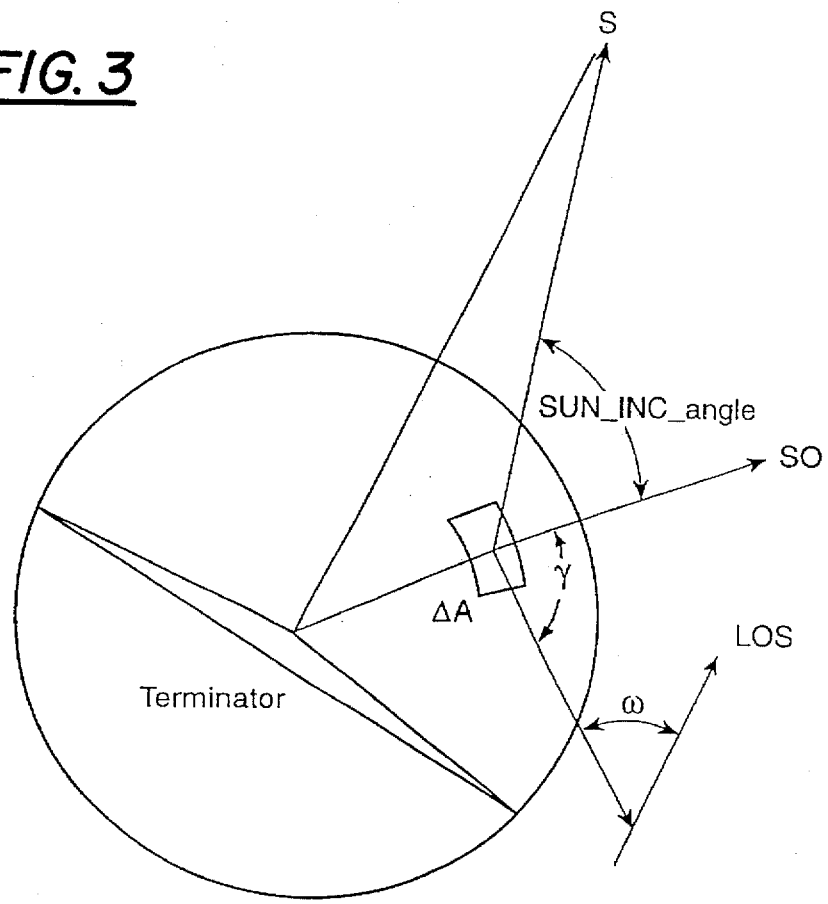
FIG. 3 shows the geometry for the earth surface integration.

FIG. 3 is an illustration of the geometry for earth surface integration. In FIG. 3, $\Delta A$ is the area of an element of the surface of a sphere, S is the sun position (not to scale) and $S_o$ is normal to the elemental area. $\gamma$ is the distance from the elemental area to the viewing instrument (which may be approximated as the distance to the spacecraft). $\omega$ is the off-axis angle between the line-of-sight-to-target of the instrument, tracker, or sensor and the elemental area. Sun-inc-angle is the sun incidence angle. The terminator is the border between the sun illuminated and dark earth.

It should be noted that the bright earth inhibits observation during a greater portion of the orbit path than does the dark earth. The differences in occultation between the bright and dark regions shown in FIG. 1 are related to separate bright and dark earth angle limits which apply over the duration of a visibility interval. Diagnostics, such as the offset of the beginning of visibility from the orbital ascending node, percentage of earth which is illuminated, and minimum angle to the visible terminator may be provided at all times.

Using these constraints, optimization is provided during a time span where the determination of occultation would otherwise require extensive processing, for example while $\lambda > \lambda_{dke}$ or $\lambda < \lambda_{bre}$. Visibility does not exist when $\lambda < \lambda_{dke}$ and visibility always exists when $\lambda > \lambda_{bre}$. The detailed processing is unnecessary since time intervals for which $\lambda < \lambda_{dke}$ or $\lambda > \lambda_{bre}$ can be determined analytically.

Occultation may occur under a number of conditions, some of which are as follows: a negative limb angle, a limb angle which is less than the dark earth angle limit, a limb angle which is less than the bright earth limit when the tangent point is bright, and an angle from the axis to the terminator which is less than the bright earth angle limit when the tangent point is dark.

Moreover, the basic visibility method is a continuously iterative determination of satisfaction of geometrical or physical constraints with optimization. This approach enables: subsystem algorithm matching in multiple-subsystem-flight software configurations, the option to store results in data structures, ease of adjustment of constraint parameters, and ease of maintenance (for example, modifications for changing constraints) since all constraints are checked each time step. Inputs include dark and bright earth limb angle limits ($\lambda_{dke}$, $\lambda_{bre}$), terminator angle pad, line-of-sight coordinates, orbital parameters and timing parameters (see sample above).

Visibility is evaluated every time step except for traversal of the dark earth occultation and traversal of the region outside the bright earth occultation. Alternatively, visibility is determined via set operations on characteristic intervals along the orbit. (See the set operation methods below.) Visibility for simultaneous observations from several components is obtained via intersection of the visibility intervals for each.

The following is a legend for angle limiting criteria used in the determination of preliminary visibility intervals.

---

LEGEND FOR ANGLE LIMIT CRITERIA

Objects
   SC = spacecraft
   E = earth
   S = sun
   T = target
Vectors
   R = Vector from earth center to instrument
   S = Sun vector from earth center
   T = Line-of-sight vector
   ON = Orbit normal vector
   SO = Surface normal vector
   P = Position unit vector
Angles, Constants and Points of Reference
   Re = Earth radius
   $\tau$ = orbital period
   $\theta$ = polar angle coordinate in terminator frame
   $\phi$ = azimuthal angle coordinate in terminator frame
   $\beta$ = arccos ($\hat{S}$, $\hat{ON}$)
   $\eta$ = arccos ($\hat{T}$, $\hat{ON}$)
   $\Omega$ = orbit right ascension of ascending node
   i = orbit inclination
   $\xi$ = bright/dark terminator angle pad above $\pi/2$ from the sun
   $\rho$ = angular radius of earth as viewed from spacecraft (=arcsin(Re/R))
   $\lambda$ = angle at spacecraft between line-of-sight and line to tangent point
   GCI = Geocentric Inertial Coordinates
   $\lambda_{bre}$ = bright earth angle limit
   $\lambda_{dke}$ = dark earth angle limit
Set Operations
   ~ negation
   $\cup$ union
   $\cap$ intersection
   $\supset$ subset
   $\in$ belongs
   $\emptyset$ null set

---

Preliminary visibility intervals can be determined using angle limiting criteria. Two methods for determining the angle limiting criteria are described in this specification. The first is as follows:

The occultation criterion is $(\hat{T}, \hat{R}) = -\cos(\lambda + \rho)$, where $\lambda = \lambda_{dke}$ or $\lambda_{bre}$ depending upon whether the tangent point is bright or dark. The bright limb of the earth or object is visible when $(\hat{R}, \hat{S}) \geq -\cos(\xi - \rho)$, and the tangent point is bright when $(\hat{S}, \hat{U}) \geq -\sin(\xi)$, $\hat{U}$ being in the direction of the tangent point from earth or object center.

$$\hat{U} = [\cos(\sigma) \hat{R} + \cos(\rho) \hat{T}]/[\sin(\sigma+\rho)]$$

The minimum axis-bright limb angle is the minimum axis-terminator angle $(\lambda_{term})$, that angle being found as described below.

Defining the sun vector as $\hat{S}_{GCI} = (S_x, S_y, S_z)$ with the terminator frame being such that the spacecraft-to-sun vector is along $(0,0,1)$, a matrix C $$C = \begin{bmatrix} c(s) & 0 & -s(s) \\ 0 & 1 & 0 \\ s(s) & 0 & c(s) \end{bmatrix} \begin{bmatrix} c(f) & s(f) & 0 \\ -s(f) & c(f) & 0 \\ 0 & 0 & 1 \end{bmatrix}$$

may be determined such that $\hat{S}_{term} = C \hat{S}_{GCI} = (0,0,1)$, where s=arccos $(S_z)$ and f=arctan $(S_y, S_x)$. Defining $\hat{R}_{term} = (R_x, R_y, R_z)$ and $\hat{T}_{term} = (T_x, T_y, T_z)$, it can be shown that $$\hat{R}_{term} = (\sin(\theta_r) \cos(\phi_r), \sin(\theta_r), \cos(\theta_r)) = C \hat{R}_{GCI}$$

and $$\hat{T}_{term} = (\sin(\theta_t) \cos(\phi_t), \sin(\phi_t), \cos(\theta_t)) = C \hat{T}_{GCI}.$$

Performing the indicated multiplication to obtain $R_x, R_y, R_z$ and $T_x, T_y, T_z$ results in expressions for the angles $\phi_r, \theta_r, \phi_t,$ and $\theta_t$:

$$\phi_r = \arctan(R_y, R_x), \theta_r = \arccos(R_z)$$

$$\phi_t = \arctan(T_y, T_x), \theta_t = \arccos(T_z)$$

Defining the unit vector from earth center to terminator to be $$\hat{V}_{term} = \begin{bmatrix} \cos(\xi)\cos(\phi) \\ \cos(\xi)\sin(\phi) \\ -\sin(\xi) \end{bmatrix}$$

the terminator end-points visible to spacecraft are obtained from the condition: $(\hat{R}_{term}, \hat{V}_{term}) = Re/R$, where $$\phi \text{end-point} = \phi_r \pm \delta\phi,$$

$\delta\phi = \arccos((Re+R \sin(\xi) \cos(\theta_r))/(R \sin(\theta_r) \cos(\xi)))$ The terminator is spanned by the interval $\phi \in [\phi_r - \delta\phi, \phi_r + \delta\phi]$, $\theta = \pi/2 + \xi$. At each point, $\lambda_{term}$ is determined as $$\arccos\left[\frac{(\underline{V} - \underline{R})}{|\underline{V} - \underline{R}|}, \hat{T}\right]$$

where $\underline{V}$ is a vector from earth center to a point on the terminator and $(\underline{V} - \underline{R})$ is a vector from the spacecraft to a point on the terminator.

Minimum $\lambda_{term}$ when the tangent point is dark is obtained by stepping over the interval in $\phi$ to obtain coarse bounds, and by performing a bracketed minimization routine or calculating an analytic solution for a quartic polynomial equation for the cosine of the minimum terminator angle resulting from the minimization of $\cos(\lambda_{term})$ with respect to $\phi$. A vanishing terminator angle is assumed to be prohibited. Loss of visibility occurs for $\lambda_{term} < \lambda_{bre}$.

The following describes a method for determining the angle limit criterion to be called the set operation method. The set operation method is preferred for complex applications and for computational speed.

Approximations of characteristic interval endpoints are obtained by analytical methods. These approximations are then bracketed and refined via iteration. Visibility intervals are obtained from intersections of the characteristic intervals. Analytic determinations are described below for the case of a circular orbit, however, non-circular orbits can be similarly treated. Visibility intervals for simultaneous observations are obtained via the intersection of visibility intervals for the individual observations.

For a specified orbit and line-of-sight pointing, the beginning-point and end-point are computed for regions a–e which are defined as described below with respect to FIG. 1. As mentioned previously, FIG. 1 illustrates the orbit of a viewing instrument with key points being identified along that orbit. The characteristic intervals identified in this example are identified as regions a–e. This particular example corresponds to FIG. 1 as follows:

| | |
|---|---|
| a | visibility, using the dark earth angle limit (see region between D1 and D2), |
| b | visibility, using the bright earth angle limit (see region between B1 and B2), |
| c | the interval in which the bright earth limb is visible (region between $BEV_1$ and $BEV_2$), |
| d | the intervals in which the tangent point is bright, and the intervals determined by them and a, b, and c in which occultation occurs for a bright tangent point (between $D_2$ and $B_2$ in this particular case, not always the same), and |
| e | the interval determined by a, b, c, and d in which occultation by a bright earth limb may occur when the tangent point is dark. |

Visibility determinations need only be made within the specific intervals defined, restricting considerably the area in which certain conditions are checked.

Defining the orbit frame to lie in the plane of the orbit with X-axis $(\theta=0)$ away from the line-of-sight direction, and defining $\hat{R} = (\cos(\theta), \sin(\theta), 0),$ $\hat{T} = (-\sin(\eta), 0, \cos(\eta)).$ $\hat{S} = (S_x, S_y, S_z)$ with time as a function of $\theta$ $(t=\tau\theta/(2\pi))$, matrices may be formed for performing transformations between GCI and the orbit frame. The following is an example of computations performed regarding regions a–e.

With regard to region a, visibility begins or ends for the value of $\hat{R}$ such that $(\hat{T}, \hat{R}) = -\cos(\lambda_{dke}+\rho)$. The occultation end-points occur symmetrically with respect to the X-axis for a circular orbit.

$$\theta = \arccos[\cos(\lambda_{dke}+\rho)/\sin(\eta)].$$

With $\theta = \pm \theta a$ as the solution ($\theta a=0$ for $\eta \leq \pi/2 - (\lambda_{dke}+\rho)$ for multi-orbit visibility assuming dark earth only), $\eta$ is obtained from the line-of-sight and orbit normal unit vectors. The line-of-sight unit vector is $$\hat{T} = (\cos(\alpha) \cos(\delta), \sin(\alpha) \cos(\delta), \sin(\delta)),$$

where $(\alpha, \delta)$ are right ascension and declination. The orbit normal unit vector is defined as $\hat{O}\hat{N}=(\sin(\Omega)\sin(i), -\cos(\Omega)\sin(i), \cos(i))$.

Region a is then defined as the region in which dark earth occultation occurs, $\theta \in [-\theta_a, \theta_a]$.

With regard to region b, occultation is determined similar to that of region a, except $\lambda_{bre}$ is used in place of $\lambda_{dke}$. Accordingly, $\theta=\pm\theta_b$ is used for the solution ($\theta_b=0$ for $\eta \leq \pi/2 - (\lambda_{bre}+\rho)$ for multi-orbit visibility without bright earth occultation). The bright earth occultation region b, defined as $\theta \in [-\theta_b, \theta_b]$, is not smaller than region a.

With regard to region c, the bright earth is visible when $(\hat{R},\hat{S}) \geq -\cos(\xi-\rho)$. The value of the sun vector at t=0 provides a lowest order approximation to the best possible value to use. To this order, the interval in which the bright earth is visible is symmetrical about the projection of S in the orbit frame. Referring the sun and spacecraft position vectors to the orbit frame, the above becomes $(S_x \cos(\theta)+S_y \sin(\theta)) \geq -\cos(\xi-\rho)$. Since $\sqrt{S_x^2+S_y^2}=\sin\beta$ we can define region c to be $\theta \in [\theta-\Gamma, \theta+\Gamma]$, where $\theta=\arctan(S_y,S_x)$ and $\Gamma=\arccos[\cos(\xi-\rho)/\sin(\beta)]$. When $\beta \leq \pi/2+(\xi-\rho)$ set $\Gamma=\pi$. $\beta$ is assumed nonzero. Upon refinement of the endpoints by iteration, the actual sun vector is used.

With regard to region d, $\hat{U}$ is defined in the direction of the tangent point from earth center. The tangent point is bright when $(\hat{S},\hat{U}) \geq -\sin(\xi)$, with equality at the end points. Thus, $\hat{U}=[\cos(\lambda) \hat{R}-\cos(\rho) \hat{T}]/[\sin(\lambda+\rho)]$ and $\lambda=\arccos[-(\hat{R},\hat{T})]-\rho$. Therefore, substituting the terms in $\theta$ for $\hat{R}$, we have two equations in the two unknowns $\theta$ and $\lambda$. Solution of these equations via stepping over $(\sim a \cap b)$ or bracketed root-finding determines the end-points of the intervals for which the tangent point is bright and occultation occurs. Occultation occurs in the region $(\sim a \cap b \cap c)$ when the tangent point is bright. Let this region be denoted as d. Occultation therefore occurs in (a∪d).

With regard to region e, there remains only one source of occultation. It lies in the region defined by $(\sim a \cap b \cap c \cap \sim d)$. Beginning at the end-point of region B (unless $(\sim a \cap b \cap c)$ is null), the visible terminator end-points are determined. The terminator azimuth $\phi$ is stepped through. From end-point to end-point, a test is performed to determine whether the angle between the line-of-sight to the terminator subtends an angle with the line-of-sight less than $\lambda_{bre}$. If so, the final occultation is found. It not, step in $\theta$ from the end-point of region b and repeat.

For the sake of run-time efficiency the following computation is performed prior to stepping in region d. An interval f is determined having a visible bright earth limb, $(\hat{R},\hat{S}) \geq \cos(\xi+\rho)$. The value of the sun vector at the X-axis provides a lowest order approximation to the best possible value to use. To this order, the interval in which only bright earth is visible is symmetrical about the projection of S in the orbit frame. Thus, $\theta \in [\theta-\Gamma, \theta+\Gamma]$, where $\theta=\arctan(S_y,S_x)$ and $\Gamma=\arccos[\cos(\xi+\rho)/\sin(\beta)]$.

Using region f as defined above, occultation occurs for $(\sim a \cap b \cap f)$. Bearing this region of occultation in mind, stepping in region d may therefore be restricted to $(\sim a \cap b \cap c \cap \sim f)$.

Sample inputs and outputs from an implementation of a sub-orbital visibility method against geometrical constraints are given in Tables 1 and 2.

The usual constraint relevant to the background flux determination is the signal-to-noise ratio (SNR). SNR computations optimize on-orbit time because visibility with geometrical constraints is conservative. SNR computations may also be provided as a tool to determine the reduction of geometrical constraints. Knowledge of instrument, earth, atmosphere, and sky radiation properties are required to make SNR computations. That is, processing for the constraint of limited allowed SNR involves knowledge of the intensity of the observed object and the determination of the intensity of the background.

With SNR, visibility durations are a function of allowed observation inception time. The initial range of observation inception times for viewing an astronomical object lies between the preceding earth occultation and the succeeding occultation less the minimum allowed observation time.

While the above relates to a determination of visibility constrained by background light interference, it could be easily generalized to the determination of visibility intervals constrained by any set of physical factors that may change during the course of an observation.

TABLE I

Sample Inputs for Sub-Orbital Visibility Against Geometrical Constraints

| | | |
|---|---|---|
| semimajor axis | = 6964.34210 | km |
| inclination | = 28.4665740 | degrees |
| lowest right ascension | = 0.00000000 | degrees |
| highest right ascension | = 10.0000000 | degrees |
| step in right ascension | = 10.0000000 | degrees |
| lowest declination | = 20.0000000 | degrees |
| highest declination | = 30.0000000 | degrees |
| step size in declination | = 10.0000000 | degrees |
| mean anomaly at inception | = 1.68525000 | degrees |
| right ascension of ascending node at inception | = 125.141422 | degrees |
| rate of change of mean anomaly | = 0.06233400 | degrees/second |
| rate of change of right ascension of ascending node | = -0.0000750 | degrees/second |
| day of year | = 240.513889 | days |
| time of day | = 0.00000000 | seconds |
| time step | = 60.0000000 | seconds |
| duration | = 9800.00000 | seconds |
| terminator angle pad | = 14.4775120 | degrees |
| bright earth angle limit | = 15.5000000 | degrees |
| dark earth angle limit | = 7.6000000 | degrees |

TABLE 2

Sample Outputs for Sub-Orbital Visibility Against Geometrical Constraints

| orbital period | | | | = | 5784.037409 seconds |
|---|---|---|---|---|---|
| ra | dec | visibility begin | visibility end | duration | offset of visibility beginning from ascending node |
| 0.0 | 20.00 | 1980.00 | 5220.0 | 3240.0 | 3780 |
| 10.0 | 20.00 | 2040.00 | 5400.0 | 3360.0 | 3720 |
| 0.0 | 30.00 | 1860.00 | 5160.0 | 3300.0 | 3900 |
| 10.0 | 30.00 | 2040.00 | 5400.0 | 3360.0 | 3720 |

As mentioned previously, the SNR constraint involves knowledge of the intensity of the background. Background light flux determinations may be used to achieve such knowledge. A method for determining the background light flux at any instant, an interactive tool to compute the flux, and specifications determining visibility duration are described in the following. Thereafter, optimization by scanning is described.

The following describes computation of background light intensity received at the spacecraft telescope entrance aperture from the sun or moon illuminated earth. Assumed in this computation are an earth reflection model; an empirical model for spacecraft attenuation of incoming off-axis light, and an empirical model for sky and atmosphere background light intensity. Time-integrated values are obtained.

The following describes an illustration of models for the background light flux computation. Reflection characteristics are based upon earth albedo and the geometry of the earth, sun, moon, spacecraft, and target. The empirical models requiring calibration are: sun-lit and moon-lit earth reflection models (1- diffuse, isotropic, wavelength-independent, bidirectional reflectance; 2- specular reflection; 3- rough terrain reflectance; and 4- rough or smooth sea reflection), planetary albedo (effective wavelength-dependent ratio of received light including atmospheric effects to the incident solar spectrum) for various reflecting types (land, rough sea, calm sea, or cloud), wavelength dependent on-board attenuation of background intensity as a function of off-axis angle of the incoming light, zodiacal light, diffuse galactic light, and geocoronal Lyman-α and oxygen-I (1304A and 1356A) emission. A solar spectrum with 100-Angstrom unit granularity or less is required for accuracy.

Zodiacal light is modelled via bilinear interpolation of published data assuming a solar spectrum and wavelength dependent albedo. Geocoronal Lyman-α, oxygen-I (1304A) and oxygen-I (1356A) emissions are modelled via interpolation of data obtained at earth-target, sun-earth, and azimuth angles subtended at the spacecraft. In the absence of data (for example, published data exists for the Lyman-α emission but not for the oxygen-I emission) geocoronal Lyman-α and OI background intensity are minimized by placing the spacecraft in shadow and the target at opposition. Diffuse galactic light is modelled by transforming the pointing direction to galactic coordinates for which published, wavelength-dependent data exists.

The implementation will have an internal spacecraft, sun, and moon ephemeris generator, a capability to read and interpolate an external spacecraft ephemeris, and a capability to fit ephemeris position data (Cartesian coordinates) with Chebyshev polynomials and use the stored fit coefficients to reproduce the ephemeris data. For example, X-, Y-, or Z- positions in a multi-day file with data every minute can be reproduced with 1-meter accuracy by 300 terms.

An earth surface grid centered at the sub-satellite point is constructed. Sectors are concentric extending to the earth limb edge, divided into user determined portions of equal azimuth and latitude. A fine grid is required for determinations near and during occultation where line-of-sight clearance of the bright earth is small (less than 16 degrees for the Hubble Space Telescope, for which the required grid size is at least 72×30). Increased resolution near the terminator and when the attenuation vs. off-axis-angle curve is steep is provided with a variable cell size. A four-fold increase in grid resolution is usually satisfactory at the terminator (eliminating errors on the order of 1%) as the contribution from flux at grazing sun incidence is small. Refraction effects are included via an empirical formula relating angle to impact parameter. A grid should be applied to latitudinal and longitudinal directions as well for the sun, moon and other solar system objects.

Flux at the detector is obtained by conversion of magnitude to photon flux and multiplication by the per-pixel field in square arcseconds.

As shown in FIG. 2, the elemental earth surface area ($\Delta A$) is (re $\Delta\theta$) (re $\sin(\theta)$ $\Delta\phi$), where the increment in latitude is $\Delta\theta=\theta m/v$ and in azimuth is $\Delta\phi=\pi/\mu$ (the full division in azimuth is 2 $\mu$). Thus, $\Delta A = 2\pi\, re^2\, \theta m\, \sin(\theta)/(2\, \mu v)$.

Flux (the power crossing a unit area of per second surface orthogonal to the flux direction of flow) is computed, for example, by assuming a constant bidirectional-reflectance-distribution-function (B) for diffuse reflection. This is well studied and can be described simply as the ratio of reflected power to incident flux. The reflected power is given by:

d$\phi$-reflected=B($\theta$-incident, $\theta$-reflected, $\lambda$) (F-incident) cos ($\theta$-incident) ($\Delta A$) cos($\theta$-reflected) d$\Omega$ where $\theta$ denotes the relevant angle.

The normalization factor B=(albedo/$\pi$) applies for hemispherical reflectance. The unattenuated, reflected flux F-reflected (in watts/m$^2$) at a given wavelength per unit incident flux is therefore:

$$\text{F-reflected}=(\text{albedo}/\pi)\, \Sigma\, \cos(\text{sun\_inc\_angle})\, (\Delta A)\, \cos(\gamma)\, \cos(\omega)/(d^2), \qquad (2)$$

where $\gamma$ is the angle between the normal to the elemental surface and the line to the spacecraft, and a 1-sq-meter cross-section at the aperture is assumed so that $d\Omega=\cos(\omega)/d^2$. The summation is carried out over all elemental areas over the entire bright earth limb. Magnitude/sq-arcsecond is obtained by applying additional factors.

A first factor to apply is a calibrated attenuation of off-axis light as a function of off-axis angle ($\omega$). Multiplication of F-reflected by the value of attenuation found in the table determines received flux at the focal plane.

A second factor to apply is scaling to obtain magnitude/sq-arcsecond. The marginal flux entering the spacecraft which results in the same power on the focal plane as from a 1-sq-arcsecond field is desired. This marginal flux is obtained from F-reflected via a factor equal to the ratio of area on the focal plane for a 1-sq-arcsecond field to the entrance aperture area $c=((\text{focal-length}) * \tan(1''))^2/$ (aperture-area). When multiplied by entrance aperture area, the power from the marginal flux equates to the power on the focal plane from a 1-sq-arcsecond field. For the Hubble Space Telescope, $c=1.42461e-8$ since the aperture-radius= 1.32 meters and the focal-length=57.6 meters. Thus, $$\text{Magnitude/sq-arcsec} = 26.7 \log 10 \ (c \ \Sigma \ (\text{F-reflected.attenuation})), \quad (3)$$

where $-26.7$ is the apparent visible (V) magnitude of the sun. A similar calculation is done for the moon, where $-12.7$ is the apparent V magnitude of the moon.

The sun incidence angle is obtained as follows. Letting $\hat{P}, \hat{S},$ and $\hat{T}$ be position, sun, and LOS unit vector; and letting $\text{zang}=\cos^{-1}(\hat{T},\hat{P})$ and $\text{sang}=\cos^{-1}(\hat{S},\hat{P})$, vector $\hat{S}=(\cos(\phi_s) \sin(\text{sang}), \sin(\phi_s) \sin(\text{sang}), \cos(\text{sang}))$, where $\phi_s$ measures the azimuth from the $\omega$ direction. Defining $$\hat{S}_\perp = (\hat{S} - (\hat{S},\hat{P})\hat{P})/|\sin(\text{sang})| = (\hat{S}-\cos(\text{sang})\hat{P})/|\sin(\text{sang})|,$$

$$\hat{T}_\perp = (\hat{T} - (\hat{T},\hat{P})\hat{P})/|\sin(\text{zang})| = (\hat{T}-\cos(\text{zang})\hat{P})/|\sin(\text{zang})|,$$

and $$L = [(\hat{T}_\perp)_x (\hat{S}_\perp)_y - (\hat{T}_\perp)_y (\hat{S}_\perp)_x]/[(\hat{T}_\perp)_x (\hat{S}_\perp)_y - (\hat{T}_\perp)_y (\hat{S}_\perp)_x],$$

we find that $\phi_s = L \cos^{-1}(\hat{S}_\perp, \hat{T}_\perp)$ or, if sang=0, $\phi_s=0$, where L is +1 or −1.

The earth element normal is: $e\hat{e}n = re(\cos(\phi) \sin(\theta), \sin(\phi) \sin(\theta), \cos(\theta))$.

The sun incidence angle is sun_inc_angle=$\cos^{-1}(\hat{S}, e\hat{e}n)$ =$\cos^{-1}(\cos(\phi) \sin(\text{sang}) \sin(\theta)+\sin(\phi_s) \sin(\phi) \sin(\text{sang} \sin(\theta))+\cos(\text{sang}) \cos(\theta))=\cos^{-1}(\cos\phi_s - \phi) \sin(\text{sang} \sin(\theta))+\cos(\text{sang} \cos(\theta))$.

If sun_inc_angle>90+$\epsilon$ degrees, where $\epsilon$ is a small pad to account for refraction, flux=0.

Software may be written in a high level language such as C++ which provides data structures and object-oriented design for the organization of the hardware features while enabling rapid processing of the visibility determinations.

Inputs for processing angle limit criteria consist of dark and bright earth limb angle limits ($\lambda_{dke}, \lambda_{bre}$), terminator angle pad, line-of-sight coordinates, orbital parameters and timing parameters.

Sample inputs and outputs for an implementation of the above method as an interactive software tool to compute cumulative, wavelength-dependent flux are as follows. Time dependent values can be produced, along with conversions to other units including instrument or sensor counts or detected electrons.

Sample inputs for background light determinations are shown in Table 3 and sample outputs for background light determinations are shown in Table 4.

TABLE 3

Sample Inputs for Background Light Determinations

| | |
|---|---|
| DEF86 | definitive ephemeris filename |
| 94.086:13:47:11 | start time as yy.ddd:hh:mm:ss |
| 60 | timestep (seconds) |
| 1.0 | duration (minutes) |
| 160.0 | right ascension (deg) |
| 0.0 | declination (deg) |
| 5000.0 | lowest wavelength (A) |
| 6000.00 | highest wavelength (A) |
| 1000.00 | wavelength increment (A) |
| 0.4 | constant albedo (used if next entry is N) |
| N | Y or N: use table for effective albedo |
| WFC | Science Instrument |
| j0.1 | Aperture Descriptor |
| 86OUT | output filename |

TABLE 4

Sample Outputs for Background Light Determinations

| | |
|---|---|
| 07/15/94 | date |
| 14:37:13 | time of run |
| 94.0872 | minimum ω-bright-earth-angle at start (deg) |
| 84.8145 | minimum ω-bright-earth-angle at end (deg) |
| 84.8145 | minimum ω-bright-earth-angle over duration (deg) |
| 0.0000 | % of forward visible earth bright at start |
| 1.3108 | % of forward visible earth bright at end |
| 1.3108 | % of forward visible earth bright - maximum |
| 0.0000 | % of forward visible earth bright - minimum |

Wavelength (A) and time-averaged fluxes (average over duration of photons/(sq-cm sec A)) per pixel for bright-earth and zodiacal-light are added to produce flux. Geocoronal-Lyman-α flux is based upon the model of F. Walter, 1991. Total time-averaged flux (sum for each column) is also shown in Table 5.

TABLE 5

| wavelength | flux | bright-earth | zodiacal-light | geocoronal |
|---|---|---|---|---|
| 5000.0000 | 1.034347e-08 | 4.370119e-16 | 1.034347e-08 | 3.941818e-03 |
| 6000.00 | 1.125456e-08 | 4.755051e-16 | 1.125456e-08 | 3.941818e-03 |
| total | 2.159803e-08 | 9.125170e-16 | 2.159803e-08 | 7.883636e-03 |

Once the preliminary visibility intervals are determined using geometric and/or physical constraints, stepping within those intervals may be performed to determine satisfaction of other criteria such as SNR. More specifically, SNR is determined as a function of time over a set of equally spaced start times inside a preliminary visibility interval according to prescribed minimum and maximum observation times. Visibility intervals within the preliminary intervals are terminated when the SNR exceeds a threshold value. Termination points are not necessarily unique. Formulas for SNR determination follows, $$\text{SNR} = (Ft/((F+B)Tt+Dt+R))^{1/2}, \text{ where } F=\text{signal flux}-p \ f \ a \ N \ d^2 \ \Delta\lambda \ 10^{-0.4m},$$

and where p is 1 for a point source and is a detector projected area on the sky for an extended source. Factors a and f are less than one, f being a factor for losses on the optical train of the telescope, and a being a factor for atmospheric and earth transmittance losses. The term d is the telescope diameter, $\Delta\lambda$ is the detector bandpass, N is a normalized photon rate of 10,000 photons/(sec-cm$^2$-A) in V-band for a source at m=0, and m is source magnitude. Throughput is represented by T, time with t, dark count rate with D, readout noise for a CCD with R, and background flux with B. Sky background is given by the above formula for S with $\phi$=detector projected area on the sky and m=magnitude/square-arcsec.

Scanning within preliminary intervals is optimized by evaluating intervals of required SNR for regularly spaced inception times over the preliminary visibility interval. Reductions of constraints for the preliminary windows are then examined to determine if required SNR can be obtained over a larger set of preliminary windows.

Performance of the background flux computation may be improved using tables for which flux for a 3-vector (solar-zenith angle, target-zenith angle, solar-target angle) is pre-determined via computation for a grid with appropriate ranges and increments. Interpolation between increments improves accuracy.

Additionally, computational time is saved for multi-orbit visibility determinations by not processing unless the orbit normal is within range of the right ascension and declination for which multi-orbit visibility is possible. Special handling of multi-orbit visibility intervals is achieved by confining line-of-sight right ascension and declination to the region about the orbit normal when multi-orbit visibility occurs. Visibility for simultaneous observations from several components is obtained via intersection of the visibility intervals for each.

Figure 4:
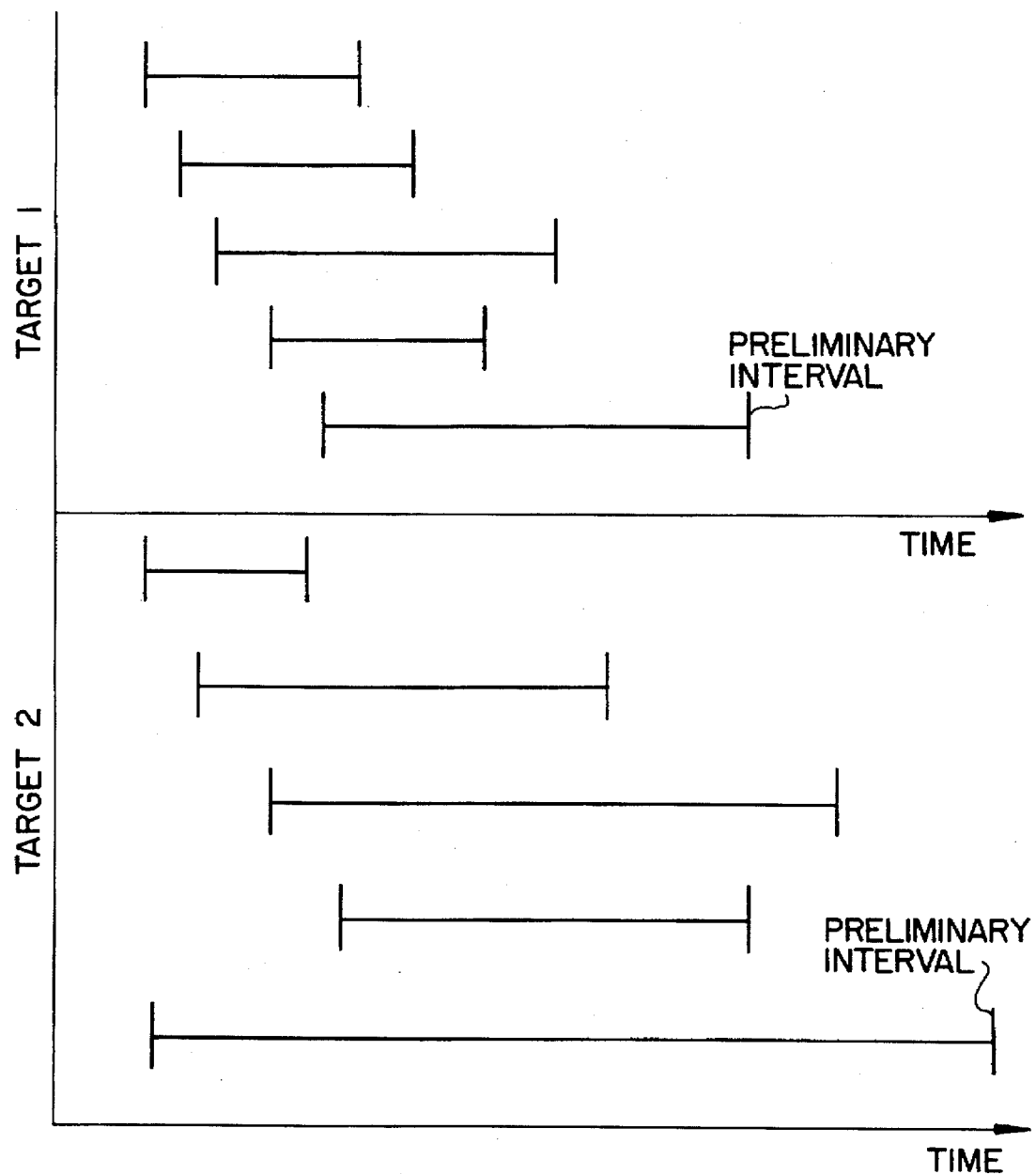
FIG. 4 illustrates a plurality of viewing intervals which satisfy physical constraints for two targets being observed.

As previously mentioned, the visibility intervals of multiple targets may be used to schedule observations using one or more viewing instruments. As shown in FIG. 4, when multiple intervals within a preliminary interval are used, additional criteria are needed to select a scheduled interval for each target. For example, one criterion is to schedule observations as indicated above to maximize time on target.

More specifically, FIG. 4 shows how a preliminary interval for each of two targets is broken down into a number of intervals satisfying the background light criteria. By selecting, for example, an interval from each (which do not conflict in time), a schedule may be developed for viewing both targets.

Any criterion may be used for selecting among the acceptable intervals. This type of simplistic scheduling is relevant to smaller but more sophisticated missions being planned. Computational speed allows for thorough optimization by trial-or-error techniques.

Until the present invention, variations in earth reflectivity (albedo) were considered large for viewing instruments and guidance sensors. However, variations in earth reflectivity are actually very small for the narrow fields of view for many guidance systems, sensors, and instruments in use. Therefore, flux prediction accuracy and thorough determinations for the scheduling algorithms are indicated.

Coarse scheduling is initially performed, followed by fine-scheduling and last-minute refinements. Brute-force trial-and-error computations of all combinations and permutations are restricted to small intervals with a well-defined number of observations. All combinations and permutations over a 1-D grid with a user-determined step are tried. Values of the step are usually between one and five minutes step are tried.

The intervals of the present invention are based on a determination of background light through a full consideration of the background light flux. That is, this invention is applicable to orbiting astronomical observatories for which the cumulative background light flux is a quantity of interest. The background light flux determination is not limited to earth, sun and moon observation.

Also disclosed is an algorithm for in-orbit calibration of the attenuation vs. off-axis angle data file for use in the background light flux determination. The attenuation is a function of the wavelength-dependent reflectivity of the inner surface of the telescope tube or similar structure, and the number of reflections occurring before reaching the focal plane. If available, pre-launch, laboratory estimates of the calibration should be used as a starter.

Continuous or nearly continuous on-orbit data on received light intensity is often available during orbit, for example, as photocounts or detected electrons. A monotonically increasing or decreasing bright earth limb angle over a large enough time span to provide adequate resolution forms the ideal scenario. Any set of data is capable of being used for the calibration in the relevant regime of angles, as long as calibration at larger angles has been accomplished.

Assume that calibration begins at a 90-degree angle, above which background light vanishes. In practice, the critical angle may be slightly greater than 90 degrees.

A procedure for obtaining data sets for each relevant wavelength band is as follows. First, the average intensity of the data is obtained as a function of time. Minimum off-axis angle is determined at each time step. For example, for a fully bright visible earth, the minimum off-axis angle is the angle between the telescope axis and the limb. The following assumes that there are several data sets, and that for each data set the bright earth limb angle decreases with time. For simplicity, the data span is assumed to begin with a 90-degree angle.

Second, the value of the attenuation at the 90-degree angle is determined. Agreement between the model and the data is achieved as follows. After the initial residual (error) is determined, the model attenuation (at 90 degrees) is adjusted, thereby providing a smaller residual to estimate the linear sensitivity. If convergence exists, it is obtained via a bisection technique. Alternatively, if attenuation values are restricted because of manufacturer specifications, the value for the minimum residual is obtained via a scan over relevant attenuation values.

Third, step 2 is repeated after the next increment in angle is reached by periodically stepping through time (typically a 1° step).

Ultimately, for unrestricted attenuation values, model and data agree exactly for each of the data sets in each wavelength regime at each of the angle increments.

Fourth, attenuation at each angle is averaged over all data sets to determine the final attenuation vs off-axis data file.

Using the above-described calibration technique enhances the accuracy with which background light can be predicted, thereby contributing to the accuracy of the background light prediction.

The objects and advantages achieved through the above described device are applicable to other devices used for observing targets under specific constraints. It should therefore be understood that the specific devices illustrated and described herein are intended to be representative only, as certain changes may be made therein without departing from the spirit and scope of this invention. Accordingly, reference should be made to the following appended claims in determining the full scope of the invention.

I claim:

1. A method for determining an interval of time for observing a target with a viewing instrument, the method including the steps of:
   determining at least one first interval of time for conducting target observations;
   determining an amount of background light flux incident during said first interval of time;
   calculating an accumulation of said background light flux incident after an accumulation start time in said first interval of time;
   comparing said accumulation to a predetermined threshold;
   determining an accumulation end time corresponding to said accumulation start time based on when said accumulation reaches said predetermined threshold;
   determining a second interval of time within said first interval of time for observation of said target, said second interval of time being between said accumulation start time and said corresponding accumulation end time; and viewing said target in accordance with said second interval of time.

2. A method as recited in claim 1 further including a step of controlling said viewing instrument to observe said target in accordance with said second interval of time.

3. The method recited in claim 1, wherein a duration of said second interval of time is based on an amount of time required to accumulate an amount of said measured background light flux equal to said predetermined threshold.

4. The method recited in claim 1, wherein constraints are used to determine said first interval of time, said constraints being characterized as one of physical, geometric, and a combination of physical and geometric.

5. The method recited in claim 1, wherein said background light flux is measured while said first interval of time is being determined.

6. The method recited in claim 1, wherein said background light flux is measured after said first interval of time is determined.

7. The method recited in claim 1, wherein a plurality of second intervals of time are determined within said first interval of time, each of said second intervals of time corresponding to a different accumulation start time and an accumulation end time corresponding to said accumulation start time.

8. The method recited in claim 7, further including a step of determining a viewing interval of time from among said second intervals of time, said viewing interval of time being determined based on characteristics of said accumulated measured incident background light flux.

9. The method recited in claim 8, wherein said characteristics of said accumulated incident background light flux include a duration of said second intervals of time.

10. The method recited in claim 1, wherein said viewing instrument is one of a star tracker and a sensor, said sensor being positioned on one of earth and a solar system object orbiting platform.

11. The method recited in claim 1, wherein said first interval of time is determined by checking for constraint satisfaction periodically.

12. A method for determining intervals of time for observing a target with a viewing instrument, said method including the steps of:
   determining more than one first interval of time for conducting target observations;
   determining an amount of background light flux incident during said first intervals of time;
   calculating a plurality of accumulations of said incident background light flux, each of said accumulations being calculated after a different accumulation start time;
   comparing each of said accumulations to a predetermined threshold;
   determining a plurality of accumulation end times which correspond to said accumulation start times, each of said accumulation end times being based on when said corresponding accumulation reaches said predetermined threshold;
   determining a plurality of second intervals of time within said first intervals of time for observation of said target, each of said second intervals of time being between one of said accumulation start times and said corresponding accumulation end time; and
   viewing said target in accordance with said second intervals of time.

13. A method as recited in claim 12 further including a step of controlling said viewing instrument to observe said target in accordance with said second intervals of time.

14. The method recited in claim 12, wherein constraints are used to determine said first interval of time, said constraints being characterized as one of physical, geometric, and a combination of physical and geometric.

15. The method recited in claim 12, wherein constraints are used to determine said first interval of time, said constraints being characterized as one of physical, geometric, and a combination of physical and geometric.

16. A method for determining intervals of time for observing a plurality of targets with a viewing instrument, said method including the steps of:
   determining an interval of time for observing a first target, said determination including the steps of:
      determining at least one first preliminary interval of time for observation of said first target, and
      determining at least one second interval of time for observation of said first target, said second interval of time being based on an accumulated amount of background light flux incident on said viewing instrument during said first preliminary interval of time;
   determining an interval of time for observing a second target, said determination including the steps of:
      determining at least one second preliminary interval of time for observation of said second target, and
      determining at least one second interval of time for observation of said second target, said second interval of time being based on an accumulated amount of background light flux incident on said viewing instrument during said second preliminary interval of time; and
   scheduling observations of said plurality of targets based on said second intervals of time for observing said first and said second target.

17. A method as recited in claim 16 further including a step of controlling said viewing instrument to observe said first and second targets in accordance with said second intervals of time.

18. The method recited by claim 16, wherein said steps of determining at least one second interval of time for observation of said first target include the steps of:
   measuring background light flux incident during at least a portion of each first preliminary interval of time;
   calculating at least one accumulation of said measured incident background light flux for each first preliminary interval of time, each accumulation beginning at a different accumulation start time;

comparing each accumulation to a predetermined threshold;

determining a plurality of accumulation end times which correspond to said accumulation start times, said accumulation end times being based on when each accumulation reaches said predetermined threshold; and determining a plurality of second intervals of time within said first predetermined interval of time for observation of said first target, each of said second intervals of time being between one of said accumulation start times and said corresponding accumulation end time.

19. A method as recited in claim 18 further including a step of controlling said viewing instrument to observe said first and second targets in accordance with said second intervals of time.

20. A method for determining an interval of time for observing a target with a viewing instrument, the method including the steps of:

determining at least one first interval of time for conducting target observations;

determining an amount of background light flux incident on said viewing instrument during said first interval of time;

calculating an accumulation of said background light flux incident during a portion of said first interval of time;

comparing said accumulation to a predetermined threshold;

determining a second interval of time within said first interval of time for observation of said target, said second interval of time starting at a beginning of said portion of said first interval of time and ending when said accumulated background light flux reaches said predetermined threshold; and viewing said target in accordance with said second interval of time.

21. A method for determining intervals of time for observing a target with a viewing instrument, said method including the steps of:

determining more than one first interval of time for conducting target observations;

determining an amount of background light flux incident during said first intervals of time;

calculating accumulations of said background light flux incident during different portions of said first intervals of time;

comparing each of said accumulations to a predetermined threshold;

determining a plurality of second intervals of time within said first intervals of time for observation of said target, each of said second intervals of time starting at a beginning of one of said portions and ending when said accumulated background light flux within said one portion reaches said predetermined threshold; and viewing said target in accordance with said second intervals of time.

22. A method for determining an interval of time for observing a target with a viewing instrument, the method including the steps of:

determining at least one first interval of time for conducting target observations;

determining an amount of background light flux incident on said viewing instrument during said first interval of time;

calculating an accumulation of said background light flux incident during a portion of said first interval of time;

comparing said accumulation to a predetermined threshold; determining a second interval of time within said first interval of time for observation of said target, said second interval of time ending when said accumulated background light flux reaches said predetermined threshold; and viewing said target in accordance with said second interval of time.

23. A method for determining intervals of time for observing a target with a viewing instrument, said method including the steps of:

determining more than one first interval of time for conducting target observations;

determining an amount of background light flux incident during said first intervals of time;

calculating accumulations of said background light flux incident during portions of said first intervals of time;

comparing each of said accumulations to a predetermined threshold;

determining a plurality of second intervals of time within said first intervals of time for observation of said target, one of said second intervals of time ending when said accumulated background light flux within one of said portions reaches said predetermined threshold; and viewing said target in accordance with said second intervals of time.

24. A viewing instrument apparatus for determining intervals of time for observation of a target, said viewing instrument comprising:

means for determining at least one first interval of time for conducting target observations;

means for determining an amount of background light flux incident during said first interval of time;

means for calculating an accumulation of said background light flux incident after an accumulation start time in said first interval of time;

means for comparing said accumulation to a predetermined threshold;

means for determining an accumulation end time corresponding to said accumulation start time based on when said accumulation reaches said predetermined threshold;

means for determining a second interval of time within said first interval of time for observation of said target, said second interval of time being between said accumulation start time and said corresponding accumulation end time; and means for viewing said target in accordance with said second interval of time.

25. A viewing instrument apparatus for determining intervals of time for observation of a target, said viewing instrument comprising:

means for determining more than one first interval of time for conducting target observations;

means for determining an amount of background light flux incident during said first intervals of time;

means for calculating a plurality of accumulations of said incident background light flux, each of said accumulations being calculated after a different accumulation start time; means for comparing each of said accumulations to a predetermined threshold;

means for determining a plurality of accumulation end times which correspond to said accumulation start times, each of said accumulation end times being based on when said corresponding accumulation reaches said predetermined threshold;

means for determining a plurality of second intervals of time within said first intervals of time for observation of said target, each of said second intervals of time being between one of said accumulation start times and said corresponding accumulation end time; and means for viewing said target in accordance with said second intervals of time.

26. A viewing instrument apparatus for determining intervals of time for observation of a target, said viewing instrument comprising:

first determining means for determining an interval of time for observing a first target, said first determining means including:

means for determining at least one first preliminary interval of time for observation of said first target, and means for determining at least one second interval of time for observation of said first target, said second interval of time being based on an accumulated amount of background light flux incident on said viewing instrument during said first preliminary interval of time;

second determining means for determining an interval of time for observing a second target, said second determining means including:

means for determining at least one second preliminary interval of time for observation of said second target, and means for determining at least one second interval of time for observation of said second target, said second interval of time being based on an accumulated amount of background light flux incident on said viewing instrument during said second preliminary interval of time; and means for scheduling observations of said plurality of targets based on said second intervals of time for observing said first and said second target.

* * * * *